US009304641B2

(12) United States Patent
Kang et al.

(10) Patent No.: US 9,304,641 B2
(45) Date of Patent: Apr. 5, 2016

(54) MULTIPLE BRIDGES SINGLE SIDED TOUCH SENSOR

(71) Applicant: Apple Inc., Cupertino, CA (US)

(72) Inventors: Sunggu Kang, San Jose, CA (US); Hao Zhang, Cupertino, CA (US); John Z. Zhong, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/218,752

(22) Filed: Mar. 18, 2014

(65) Prior Publication Data

US 2015/0077383 A1    Mar. 19, 2015

Related U.S. Application Data

(60) Provisional application No. 61/879,635, filed on Sep. 18, 2013, provisional application No. 61/917,784, filed on Dec. 18, 2013.

(51) Int. Cl.
*G06F 3/041* (2006.01)
*G06F 3/044* (2006.01)

(52) U.S. Cl.
CPC ...... *G06F 3/044* (2013.01); *G06F 2203/04111* (2013.01); *Y10T 29/49117* (2015.01)

(58) Field of Classification Search
None
See application file for complete search history.

(56) References Cited

U.S. PATENT DOCUMENTS

| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 6,970,160 | B2 | 11/2005 | Mulligan et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |

(Continued)

FOREIGN PATENT DOCUMENTS

| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Joseph Haley
(74) *Attorney, Agent, or Firm* — Morrison & Foerster LLP

(57) ABSTRACT

A touch sensor panel can include a plurality of drive lines crossing a plurality of sense lines, forming an array. The plurality of drives lines and the plurality of sense lines can be formed by interconnecting sections of at least one conductive material with a plurality of bridges. The geometry and size of one or more of the plurality of bridges and the arrangement of the sections can be altered to reduce the overall resistance of a section, improve optical uniformity, and/or increase conductance. Additionally, the sensitivity to and differentiation between touch, hover, or proximity can be enhanced based on the number of bridges and the number of hot spots.

29 Claims, 12 Drawing Sheets

(56) References Cited

U.S. PATENT DOCUMENTS

| | | | |
|---|---|---|---|
| 2006/0197753 A1 | 9/2006 | Hotelling | |
| 2008/0309633 A1* | 12/2008 | Hotelling et al. | 345/173 |
| 2010/0238133 A1* | 9/2010 | Wu et al. | 345/174 |
| 2012/0319990 A1* | 12/2012 | Chan et al. | 345/174 |
| 2014/0001024 A1* | 1/2014 | Liao et al. | 200/600 |
| 2014/0055383 A1* | 2/2014 | Kim et al. | 345/173 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

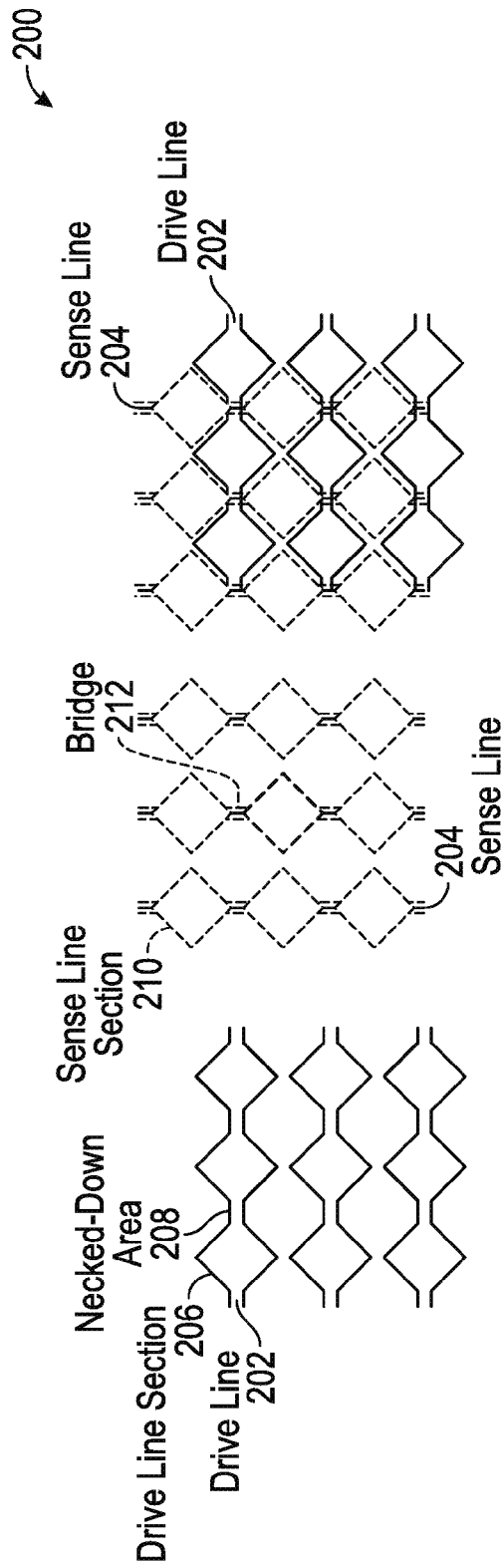
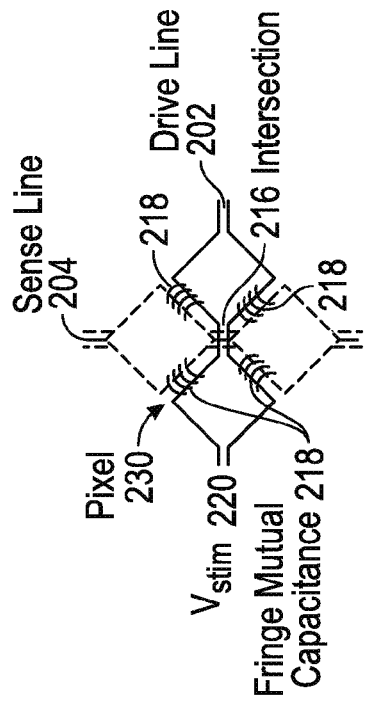
FIG. 2A
FIG. 2B

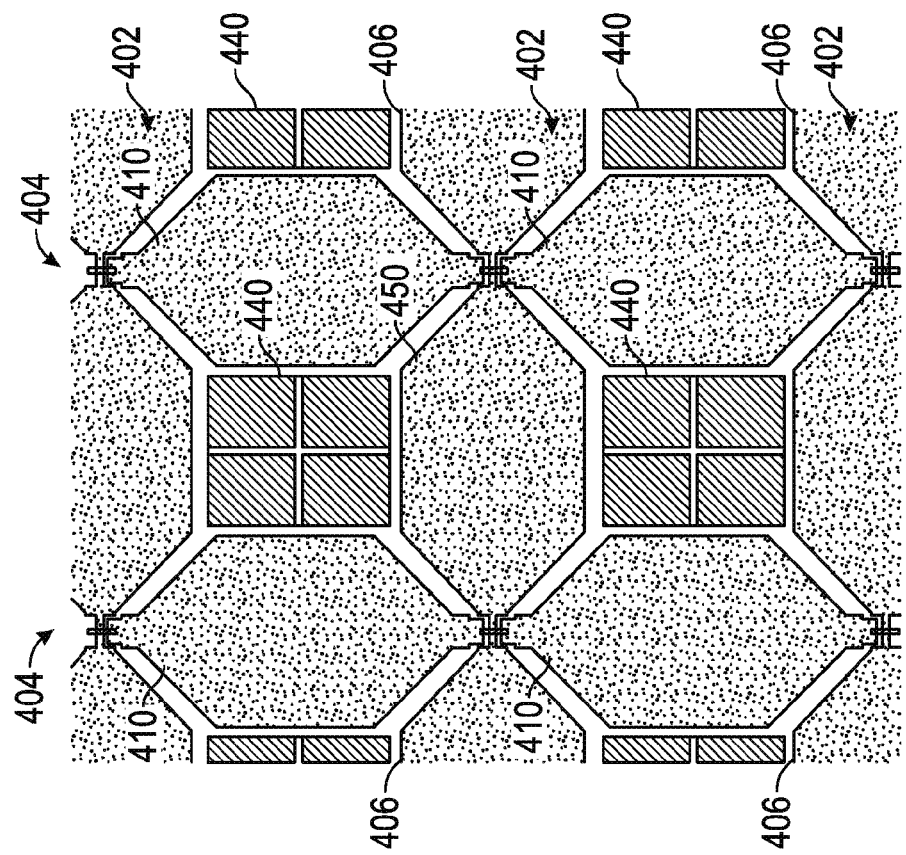
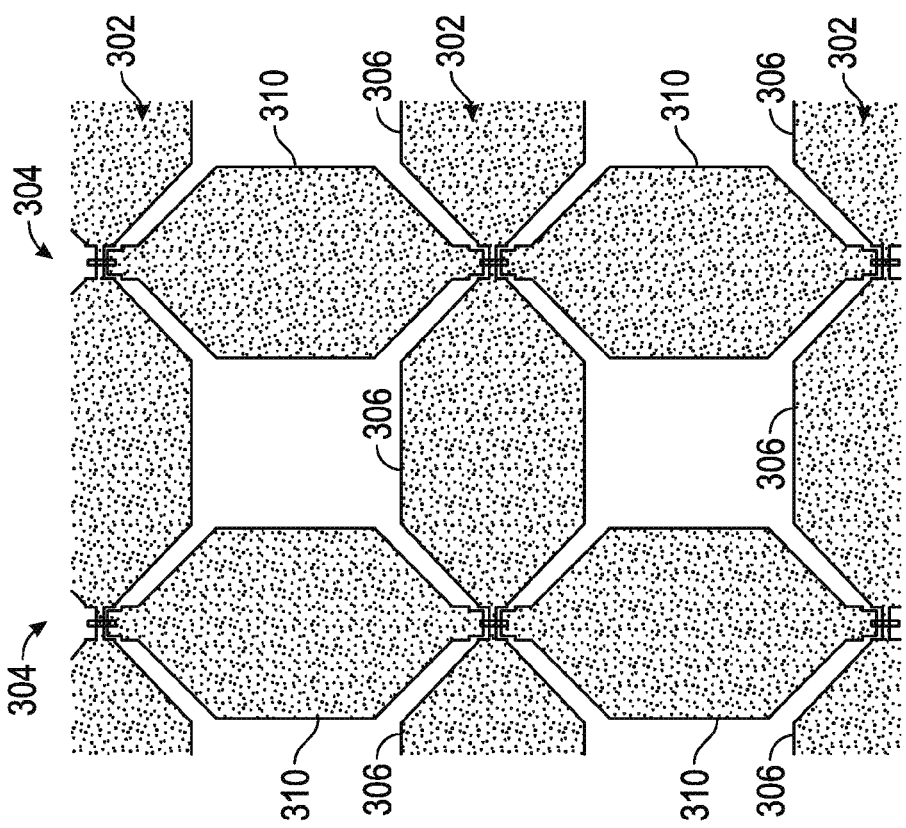

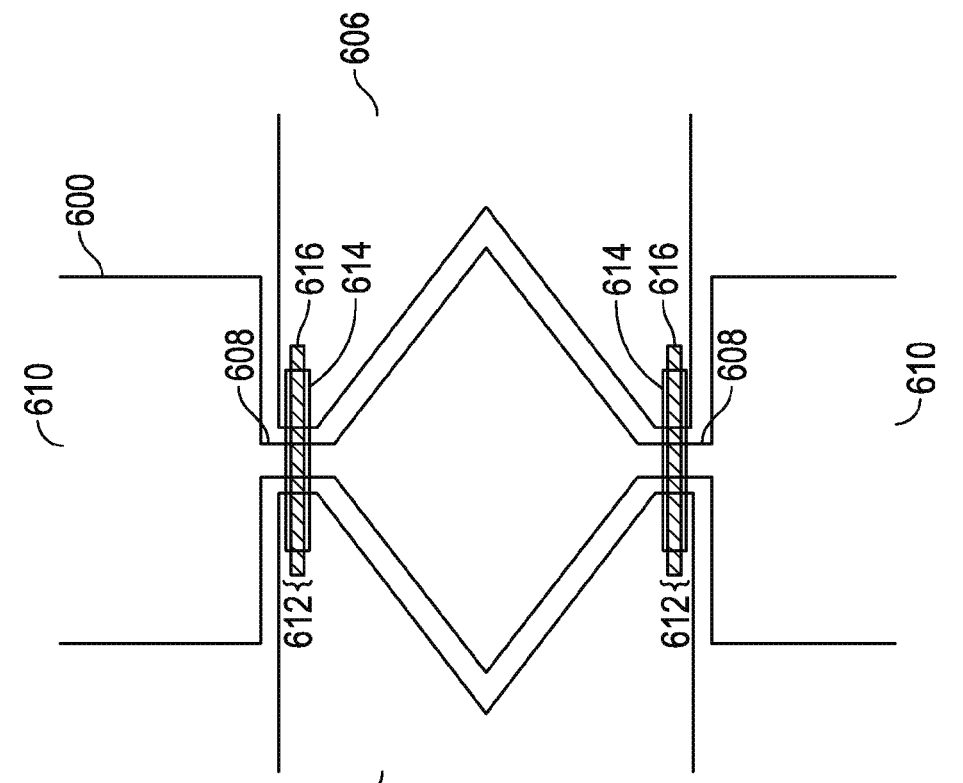
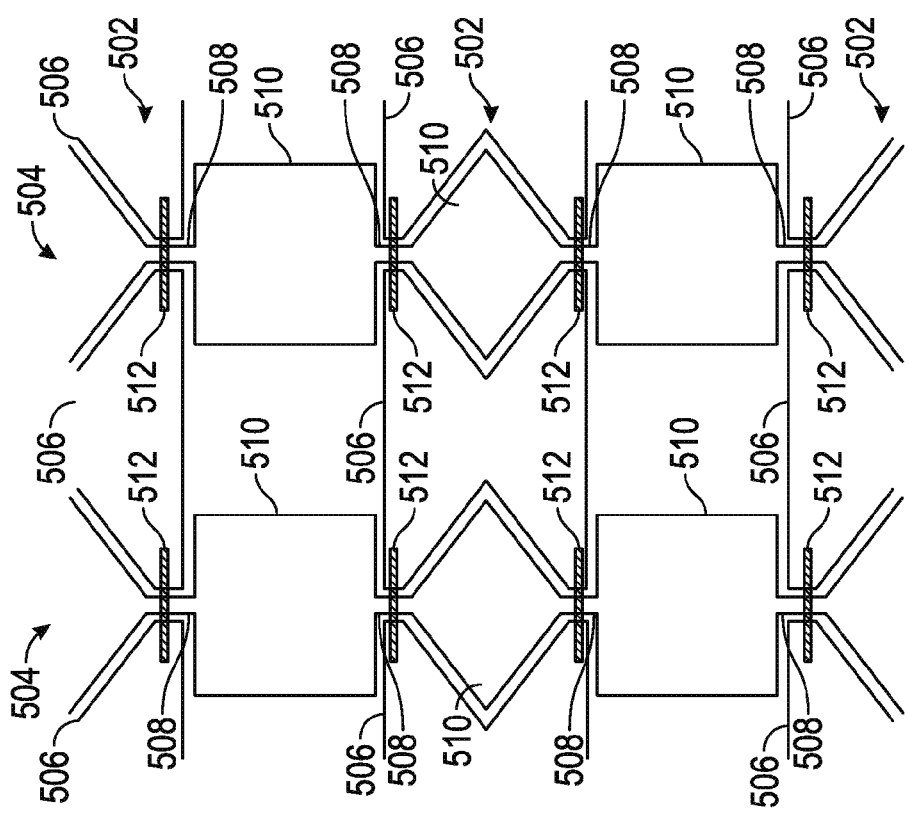

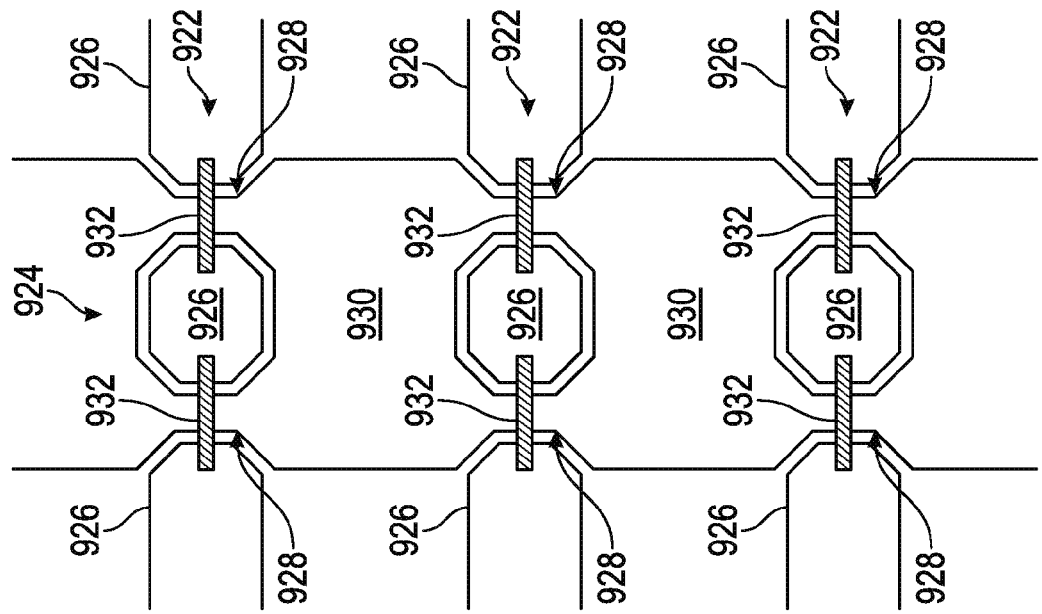
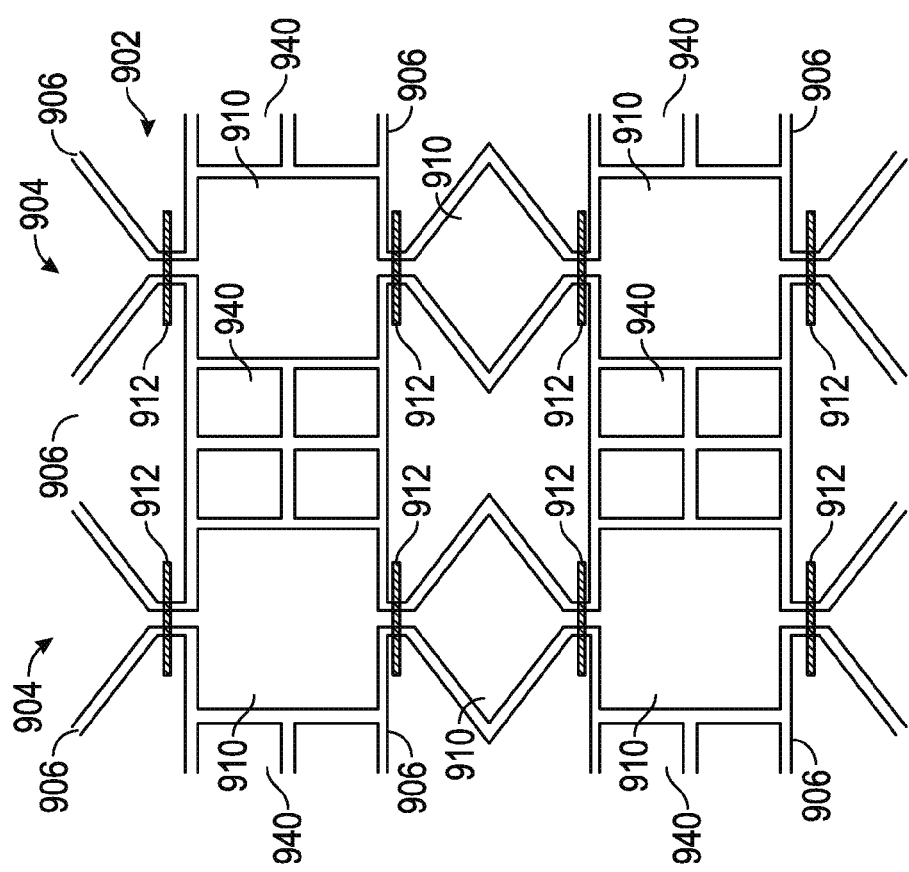

MULTIPLE BRIDGES SINGLE SIDED TOUCH SENSOR

FIELD

This relates generally to touch sensor panels, and in particular, to touch sensor panel designs that improve touch sensitivity and optical uniformity.

BACKGROUND

Many types of input devices are presently available for performing operations in a computing system, such as buttons or keys, mice, trackballs, joysticks, touch sensor panels, touch screens, and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus, or other object at a location dictated by a user interface (UI) being displayed by the display device. In general, touch screens can recognize a touch event and the position of the touch event on the touch sensor panel. The computing system can then interpret the touch event in accordance with the display appearing at the time of the touch event, and thereafter can perform one or more actions based on the touch event.

Mutual capacitance touch sensor panels can be formed from a matrix of drive and sense lines of a substantially transparent conductive material, such as Indium Tin Oxide (ITO), often arranged in rows and columns in horizontal and vertical directions on a substantially transparent substrate. Drive signals can be transmitted through the drive lines, which can result in the formation of static mutual capacitance at the crossover locations (sensing pixels) of the drive lines and the sense lines. The static mutual capacitance, and any changes to the static mutual capacitance due to a touch event, can be determined from sense signals that can be generated in the sense lines due to the drive signals.

The touch sensing pixels can be varied in size and/or spacing to enable touch sensitivity in large panels without increasing the number of drive and sense lines which can otherwise adversely affect optical uniformity when viewing the display device through the touch panel. However, increasing the size and/or spacing of the touch sensing pixels can negatively affect the resistance and mutual capacitance per pixel, thereby hindering touch sensitivity of the touch panel and limiting the speed at which the touch panel can operate.

SUMMARY

This relates to a touch sensor panel including a plurality of drive lines and plurality of sense lines formed on the same layer and utilizing a plurality of bridges at crossover locations, according to one example. The plurality of drives lines and/or the plurality of sense lines can be formed by interconnecting sections of at least one conductive material. Drive line sections and/or sense line sections can be interconnected with a plurality of bridges, whose interconnect layer can be an opaque metal or other conductive material. The geometry and size of one or more of the plurality of bridges and the arrangement of the sections can be altered to reduce the overall resistance of a section, improve optical uniformity, and/or increase conductance. A black mask or other opaque covering can be layered over one or more of the plurality of bridges to further minimize optical non-uniformity. In addition, one or more conductive dummy regions can be disposed in an area of the touch sensor panel around the sections of the plurality of drive lines and the plurality of sense lines to improve optical uniformity and to enhance the touch detection capabilities of the touch sensor panel.

BRIEF DESCRIPTION OF THE DRAWINGS

FIG. 2A illustrates an example arrangement of diamond-shaped sections of ITO that are interconnected on the same layer and side of a single substrate FIG. 2B illustrates an example pixel generated from diamond-shaped drive lines and sense lines on the same side of a single substrate FIG. 3 illustrates an example array of drive lines and sense lines formed of interconnected sections.

FIG. 4 illustrates an example array of drive lines and sense lines formed of interconnection sections with isolated dummy regions formed between drive lines and sense lines.

FIG. 5 illustrates an exemplary arrangement of drive and sense lines on a same side of a single substrate interconnected using a double bridge configuration according to various examples.

FIG. 6A illustrates a close-up view of an exemplary intersection of drive line sections and sense line sections using a double bridge configuration.

FIG. 9A illustrates an exemplary arrangement of drive and sense lines on the same side of a single substrate interconnected using a double bridge configuration and isolated dummy regions according to various examples.

FIG. 9B illustrates an exemplary arrangement of drive and sense lines on the same side of a single substrate interconnected using a double bridge configuration according to various examples.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

This relates to the formation of touch sensor panels, and in some examples, larger-size touch sensor panels. A touch sensor panel, according to various examples, can include a plurality of drive lines crossing a plurality of sense lines, forming an array. The plurality of drives lines and the plurality of sense lines can be formed by interconnecting sections of at least one conductive material with a plurality of bridges. The geometry and size of one or more of the plurality of bridges and the arrangement of the sections can be altered to reduce the overall resistance of a section, improve optical uniformity, and/or increase conductance.

Although examples may be described and illustrated herein in terms of mutual capacitance touch sensor panels, it should be understood that the various examples are not so limited, but can be additionally applicable to self-capacitance sensor panels, single and multi-touch sensor panels, and other sensors in which multiple simultaneous stimulation signals are used to generate a composite sense signal. Furthermore, it should be understood that various examples are also applicable to touch sensor panel configurations, such as configurations in which the drive and sense lines are formed in non-orthogonal arrangements, on the back of a cover glass (BOC), on the same side of a single substrate, one glass solution (OGS), or integrated with display circuitry.

Figure 1:
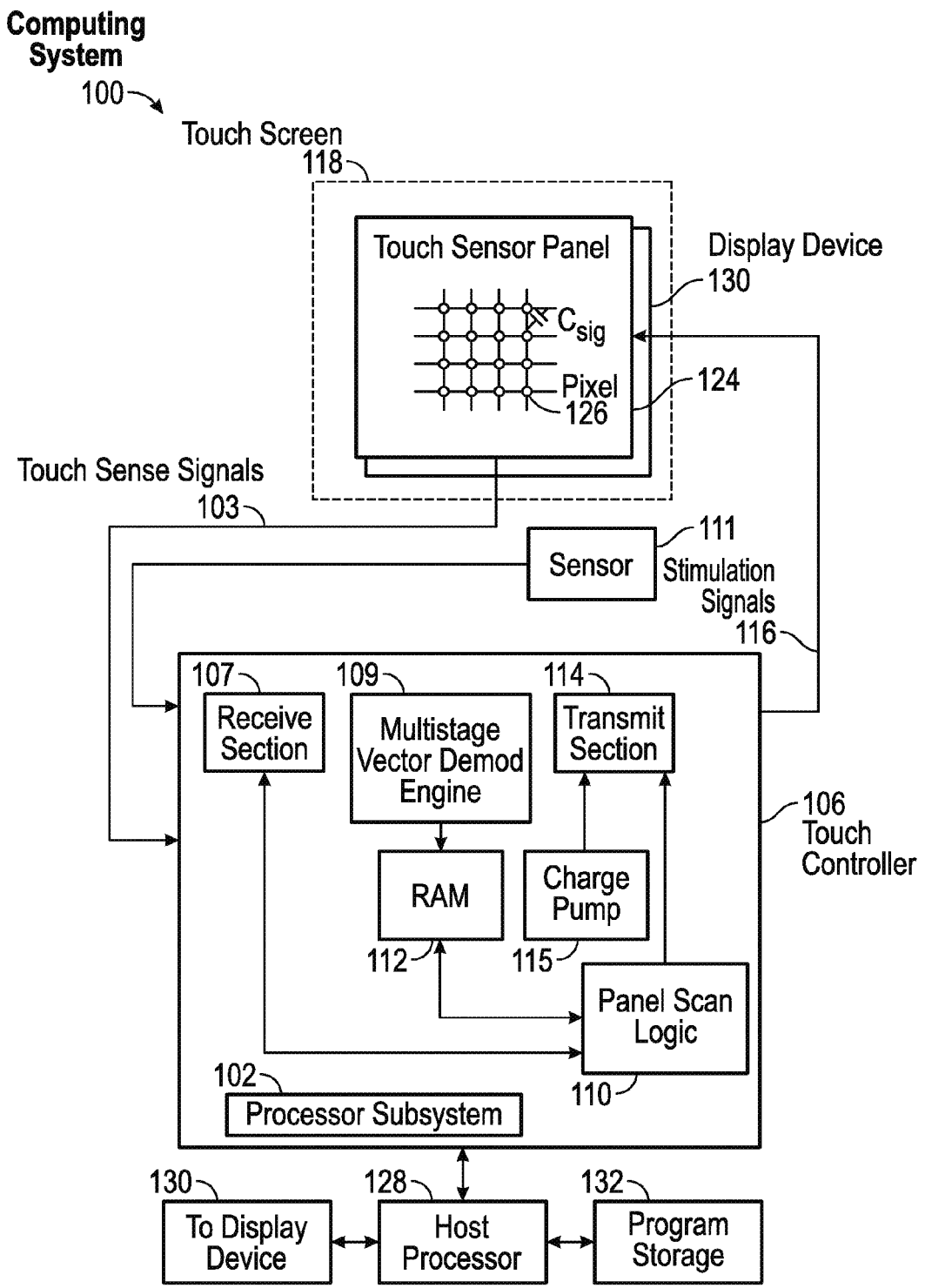
FIG. 1 illustrates an exemplary computing system that can utilize a touch controller with an integrated drive system according to various examples.

FIG. 1 illustrates exemplary computing system 100 that can utilize touch controller 106 with integrated drive system according to various examples. Touch controller 106 can be a single application specific integrated circuit (ASIC) that can include one or more processor subsystems 102, which can include, for example, one or more main processors, such as ARM968 processors or other processors with similar functionality and capabilities. However, in other examples, some of the processor functionality can be implemented instead by dedicated logic, such as a state machine. Processor subsystems 102 can also include, for example, peripherals such as random access memory (RAM) 112 or other types of memory or storage, watchdog timers (not shown), and the like. Touch controller 106 can also include, for example, receive section 107 for receiving signals, such as touch sense signals 103, from the sense lines of touch sensor panel 124, and other signals from other sensors such as sensor 111, etc. Touch controller 106 can also include, for example, a demodulation section such as multistage vector demod engine 109, panel scan logic 110, and a drive system including, for example, transmit section 114. Panel scan logic 110 can access RAM 112, autonomously read data from the sense channels, and provide control for the sense channels. In addition, panel scan logic 110 can control transmit section 114 to generate stimulation signals 116 at various frequencies and phases that can be selectively applied to the drive lines of the touch sensor panel 124.

Charge pump 115 can be used to generate the supply voltage for the transmit section. Stimulation signals 116 (Vstim) can have amplitudes higher than the maximum voltage the ASIC process can tolerate by cascading transistors. Therefore, using charge pump 115, the stimulus voltage can be higher (e.g. 6V) than the voltage level a single transistor can handle (e.g. 3.6 V). Although FIG. 1 shows charge pump 115 separate from transmit section 114, the charge pump can be part of the transmit section.

Touch sensor panel 124 can include a capacitive sensing medium having a plurality of drive lines and a plurality of sense lines. The drive and sense lines can be formed from a transparent conductive medium such as Indium Tin Oxide (ITO) or Antimony Tin Oxide (ATO), although other transparent and non-transparent materials such as copper can also be used. In some examples, the drive and sense lines can be perpendicular to each other, although in other examples other non-Cartesian orientations are possible. For example, in a polar coordinate system, the sensing lines can be concentric circles and the driving lines can be radially extending lines (or vice versa). It should be understood, therefore, that the terms "drive lines" and "sense lines" as used herein are intended to encompass not only orthogonal grids, but the intersecting traces or other geometric configurations having first and second dimensions (e.g. the concentric and radial lines of a polar-coordinate arrangement). The drive and sense lines can be formed on, for example, a single side of a substantially transparent substrate.

At the "intersections" of the traces, where the drive and sense lines can pass adjacent to and above and below (cross) each other (but without making direct electrical contact with each other), the drive and sense lines can essentially form two electrodes (although more than two traces could intersect as well). Each intersection of drive and sense lines can represent a capacitive sensing node and can be viewed as pixel or node 126, which can be particularly useful when touch sensor panel 124 is viewed as capturing an "image" of touch. (In other words, after touch controller 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel.) The capacitance between drive and sense electrodes can appear as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which is a function of Csig.

Computing system 100 can also include host processor 128 for receiving outputs from processor subsystems 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can perform additional functions that may not be related to panel processing, and can be coupled to program storage 132 and display device 130 such as an LCD display for providing a UI to a user of the device. In some examples, host processor 128 can be a separate component for touch controller 106, as shown. In other examples, host processor 128 can be included as part of touch controller 106. In other examples, the functions of host processor 128 can be performed by processor subsystem 102 and/or distributed among other components of touch controller 106. Display device 130 together with touch sensor panel 124, when located partially or entirely under the touch sensor panel, can form touch screen 118.

Note that one or more of the functions described above can be performed, for example, by firmware stored in memory (e.g. one of the peripherals) and executed by processor subsystem 102, or stored in program storage 132 and executed by host processor 128. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as a CD, CD-R, CD-RW, DVD, DVD-R, or DVD-RW, or flash memory such as compact flash cards, secured digital cards, USB memory devices, memory sticks and the like.

FIG. 2A illustrates an exemplary arrangement of diamond-shaped sections of ITO that can be interconnected on the same layer and side of a single substrate. Drive lines can be formed from areas of substantially transparent ITO sections 206 connected at adjacent facing points by necked-down area 208. Each sense line 204 can similarly be formed from areas of substantially transparent ITO sections 210 connected at adjacent facing points with bridges 212, which can "jump over" the interconnected drive line sections 206 at necked-down area 208. Sense lines 204 can be connected to a pre-amplifier held at a virtual ground of around 1.5V, and one or more drive lines 202 can be stimulated with the others held at direct current (DC) voltage levels.

FIG. 2B illustrates an exemplary pixel 230 generated from diamond-shaped drive lines 202 and sense lines 204 on the same side of a single substrate. If drive line 202 is stimulated with a stimulation signal Vstim 220, a static mutual capacitance can form at intersection 216 of the necked-down areas. The static mutual capacitance at intersection 216 can be undesirable because a finger or other object may not be able to block many of the fringing fields. A fringe mutual capacitance 218 can also form between the diamonds in the stimulated drive lines and the adjacent sense line diamonds. Fringe mutual capacitance 218 between adjacent diamonds can be of roughly the same order as the mutual capacitance formed between drive and sense lines separated by a substrate. Fringe mutual capacitance 218 between adjacent row and column diamonds can be desirable because a finger or other object may be able to block some of the fringing electric field lines and effect a change in the mutual capacitance that can be detected by the analog channels connected to the rows. As shown in FIG. 2B, there can be four "hot spots" of fringing mutual capacitance indicated at 218 that can be blocked by a finger or other object.

FIG. 3 illustrates an exemplary array of drive lines 302 and sense lines 304 formed of interconnected sections 306/310. Drive lines 302 can be formed from connected truncated diamond-shaped sections 206. Sense lines 304 can be formed by interconnecting truncated diamond-shaped sections 310 using bridges 312, which can connect individual sections 310 by crossing or jumping over sections 306 in necked-down areas. Bridge 312 can include an insulating material and an interconnect layer. The interconnect layer can be made of a conductive material that can extend beyond the insulating material to short together sense line sections 310.

FIG. 4 illustrates an exemplary array of drive lines 402 and sense lines 404 formed of interconnection sections 406/410 with isolated "dummy" regions formed between drive lines 402 and sense lines 404. The dummy regions can be disposed in an area of the touch sensor panel around the plurality of drive lines and plurality of sense lines to improve optical uniformity and enhance the touch detection capabilities of the touch sensor panel. The dummy regions 440 can be of the same composition as drive line sections 406 and sense line sections 410, and can be formed between drive lines 402 and sense lines 404 on the same layer as drive and sense lines. Because of the dummy regions, almost all areas of the substrate can be covered (i.e. substantially covered) with the same material, providing optical uniformity. A large parasitic mutual capacitance can form between stimulated drive lines 402, for example, and dummy regions 440, but because dummy regions 440 are isolated, their voltage potential can move along with stimulated drive lines 402 and can have minimal or no negative impact on touch detection. The number of dummy regions 440 can be increased by reducing the size of each dummy region, which can further reduce parasitic mutual capacitance.

To enhance touch sensitivity, the touch sensor panel can be designed to have reduced parasitic capacitance without a significant increase in overall resistance of the drive line and sense line sections. Parasitic capacitance can form between conductive elements in the touch screen, such as between drive and sense line sections. Undesirable effects of parasitic capacitance can include reduced touch sensitivity. A way to reduce the parasitic capacitance can be to form drive line sections and/or sense line sections that are truncated; for example, sections that have a truncated-diamond shape. Reducing the surface area of the section at its widest point (e.g. chopping off the corners of the diamond) or at locations where sheet resistance in Ohms per square is lowest can lead to lower parasitic capacitance. The drive line and sense line sections can also be formed with an increased width of arm 450. The increased width of the arm 450 can increase the conductance, thus reducing the resistance as compared to narrower arms. Other methods to reduce parasitic capacitance can include incorporating dummy regions, as discussed above, and increasing the number of dummy regions. However, the amount of reduction in surface area of a section at its widest point, the amount of increase in the width of the arms, and the amount of increase in the number of dummy regions can be limited.

An additional means to lowering the overall resistance of the sections can include altering the size and/or geometry of the bridges. Bridges with smaller sizes and lower length-to-width ratios can lower the line resistance. However, decreasing the bridge size or length-to-width ratio can be limited by the conductance. A sufficient amount of conductance is needed for the bridges to adequately interconnect the drive line or sense line sections. To achieve a higher conductance or lower contact resistance, the bridge size can be increased, but this may have a negative impact on optical uniformity. In particular, light can reflect from the conductive interconnect layer that forms the bridges, and a larger amount of the conductive interconnect layer can become more visible to the user.

FIG. 5 illustrates an exemplary arrangement of drive and sense lines on the same side of a single substrate interconnected using a double bridge configuration according to various examples. Sense lines 504 can be formed by interconnecting sense line sections 510 at necked-down areas 508 in a continuous manner (i.e., the sections and necked-down areas are formed from a single, uninterrupted conductive material layer). Drive lines 502 can be formed by interconnecting drive line sections 506 using bridges 512, for example, which can connect individual drive line sections 506 by crossing or jumping over sense line sections 504 at the locations of necked-down areas 508. That is, bridges 512 can connect individual sections 506 over or under the connection point of sections 506.

Figure 6B:
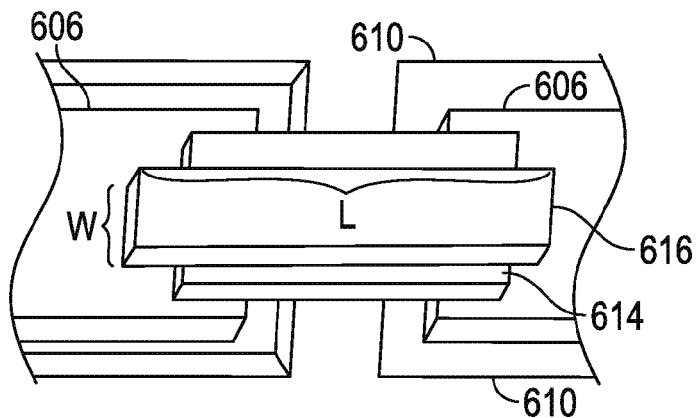
FIGS. 6B-6D illustrate cross-sectional views of exemplary bridge configurations.
Figure 6C:
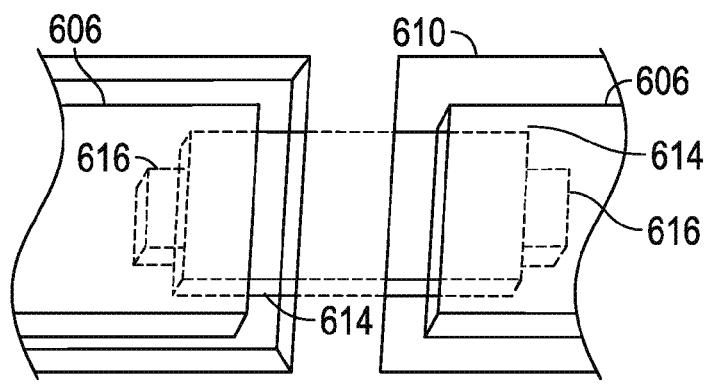
Figure 6D:
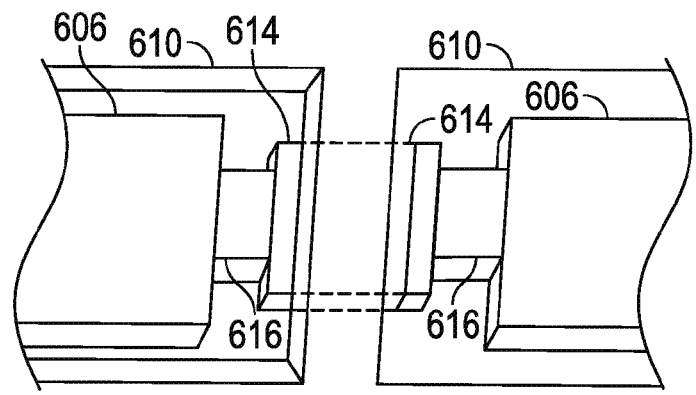

FIG. 6A illustrates a close-up view of an exemplary intersection of drive line sections and sense line sections using a double bridge configuration. Bridges 612 can be formed of an insulating material 614 and an interconnect layer 616. The bridge 612 can be formed over the conductive material (e.g. ITO) layer that forms the drive line sections 610, sense line sections 606, and necked-down areas 608. The interconnect layer 616, which can be made of metal or other conductive material, such as opaque metal or ITO, can be formed over the insulating layer 614, extending beyond the insulating layer to short together drive line sections 606. FIG. 6B illustrates a cross-sectional view of an exemplary bridge formed after the drive line sections and sense line sections are formed. In alternative examples, the process of forming the ITO layer, insulating layer, and the interconnect layer can be reversed. FIG. 6C illustrates a cross-sectional view of an exemplary bridge formed before the drive and sense line sections are formed. Interconnect layer 616 can be deposited, followed by the deposition of insulating layer 614, and then the deposition of drive line sections 606 and sense line sections 610. FIG. 6D illustrates a cross-sectional view of an exemplary bridge formed after the drive line sections 606 were formed, but before sense line sections 610 were formed. Interconnect layer 616 can be formed after or at the same time as the drive line sections.

Figure 7:
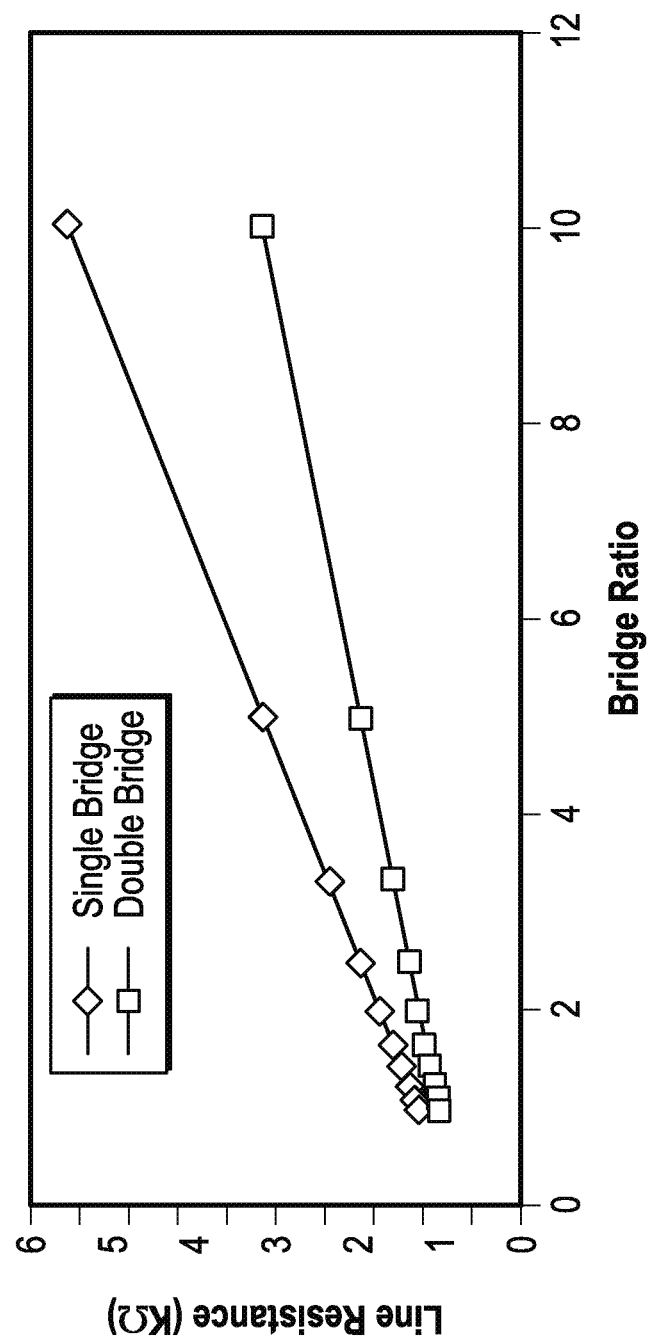
FIG. 7 illustrates a relationship between line resistance and bridge ratio for exemplary single and double bridge configurations.
Figure 8:
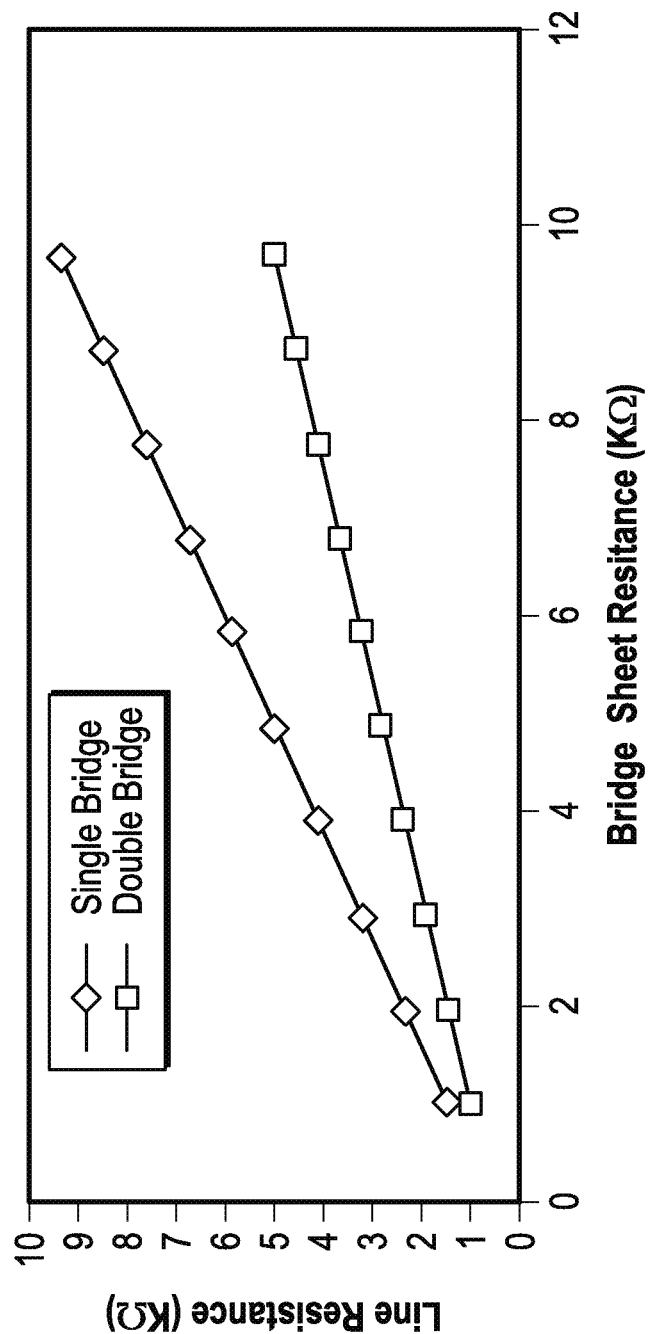
FIG. 8 illustrates a relationship between line resistance and bridge sheet resistance for exemplary single and double bridge configurations.

FIG. 7 illustrates a relationship between line resistance and bridge ratio for exemplary single and double bridge configurations. The bridge ratio is defined as the length L of the interconnect layer divided by the width W of the interconnect layer, as shown in FIG. 6B. FIG. 8 illustrates a relationship between line resistance and bridge sheet resistance for exemplary single and double bridge configurations. As illustrated in FIGS. 7-8, the double bridge configuration can achieve a lower resistance than the single bridge configuration. The higher resistance of the single bridge configuration can affect the electrical performance of the touch panel by, for example, reducing the touch sensitivity. In particular, the impact of a double bridge configuration on the resistance can be significant when the bridge ratio is high (i.e. the bridge is long and narrow and more closely resembles a wire) or for large touch panel designs. There can exist a trade-off between line resistance and optical uniformity, where bridges with a high line resistance can have improved optical uniformity and vice versa.

In some examples, the touch panels can include a double bridge configuration at the intersections of the drive and sense lines to lower the resistance of the overall section without a change in optical uniformity. The bridges in the double bridge configuration can be the same size and geometry as the bridges in the single bridge configuration. In some examples, the size of the bridges in the double bridge configuration can be decreased compared to the single bridge configurations. Decreasing the size of the bridges in the double configuration can improve the optical uniformity without an increase in resistance compared to bridges in the single configuration. For a touch panel with a single bridge configuration, a bridge with dimensions of, for example, 57 μm×5 μm can be formed. To form the touch panel with a double bridge configuration, a bridge with dimensions of, for example, 33 μm×5 μm can be formed, and the same line resistance can be achieved as the single bridge configuration. The reduction in size can lead to less amount of light reflected off the conductive interconnect layer, making optical artifacts less noticeable to the user. Additionally, the lower limit on the bridge size can be smaller in the double bridge configuration than in the single bridge configuration due to the lower resistance. A lower limit on the size of the bridge, such as 5 μm×50-100 μm, can be feasible in the double bridge configuration, whereas the same size bridges for the single bridge configuration can lead to resistance values that could impair the performance of the touch panel.

In some examples, the size of the bridges in the double bridge configuration can be increased compared to the single bridge configurations. An increase in size can lead to an increase in conductance and a reduction in contact resistance. In some examples, the shape of the bridge can be configured to achieve a decrease in contact resistance. Bridge shapes can include, but are not limited to, dumbbells, diamonds, and wings. In some examples, the bridges can be formed of an index matching material to improve optical uniformity. In some examples, the interconnect layer thickness can be increased to achieve a lower resistance. In some examples, different materials can be used for the interconnect layer of the bridge. The double bridge configuration can allow for the use of a high resistivity material for the interconnect layer without negatively affecting overall resistance or optical uniformity.

In the above examples, the surface area of a section at its widest point or where the sheet resistance is lowest can be reduced to reduce overall parasitic mutual capacitance. An example of this can be truncated diamond shaped drive line sections 606 and sense line sections 610, although other shapes can be used. In the above examples, an optional black mask (or other non-reflective material) can be applied over interconnect 612 to reduce negative optical artifacts. In some examples, arms 600 can be made as wide as possible in order to increase capacitance, thus reducing resistance. In some examples, the design and configurations of the arms can be varied without departing from the scope of the present disclosure. For example, in one alternative example, the narrowest arm portion of sections 610, along with necked-down areas between sections 606, can be formed in an angled manner at the sides. In some examples, the portion of arm 600 that is interconnecting to another arm 600 can be made as narrow as possible, while each arm 600 increases in width as much as possible from the point of interconnecting in order to decrease resistance.

FIG. 9A illustrates an exemplary arrangement of drive and sense lines on the same side of a single substrate interconnected using a double bridge configuration and isolated "dummy" regions according to various examples. Dummy regions 940 can be of the same composition as drive line sections 906 and sense line sections 910, and can be formed between drive lines 902 and sense lines 904 on the same layer as drive and sense lines. Because of the dummy regions, almost all areas of the substrate can be covered (i.e. substantially covered) with the same material, providing optical uniformity. A large parasitic mutual capacitance can form between stimulated drive lines 902, for example, and dummy regions 940, but because dummy regions 940 are isolated, their voltage potential can move along with stimulated drive lines 902 and can have minimal or no negative impact on touch detection. The number of dummy regions 940 can be increased by reducing the size of each dummy region, which can further reduce parasitic mutual capacitance. Dummy regions can be formed at the same time as the drive line sections or sense line sections, at the same time as the interconnects of the bridges, or can be formed separately.

FIG. 9B illustrates an exemplary arrangement of drive and sense lines on a same side of a single substrate interconnected using a double bridge configuration according to various examples. Drive lines 924 can be formed by interconnecting drive line sections 930 at necked-down areas 928 in a continuous manner (i.e., the sections and necked-down areas are formed from a single, uninterrupted conductive material layer). Sense lines 922 can be formed by interconnecting sense line sections 926 using bridges 932, for example, which can connect individual sense lines sections 926 by crossing or jumping over drive line sections 924 at the locations of necked-down areas 928. That is, bridges 932 can connect individual sections 926 over or under the connection point of sections 926. Similar to FIG. 9A, two bridges can be located at the intersection of the drive and sense lines, and as a result, a lower resistance than the single bridge configuration can be achieved. Additionally, the optical uniformity of the touch panel can be improved by using smaller bridges or bridges with a higher bridge ratio. Additionally, the bridges at each intersection can be configured to connect the sense lines sections 926 in a serial manner, as shown in FIG. 9B. In some examples, the overall resistance can be further lowered by widening the drive line sections 930. In some examples, the width and/or surface area of the drive line sections can be greater than the width and/or surface area of the sense line sections. In some examples, one or more dummy regions can be disposed in an area between the drive lines and sense lines.

Figure 10:
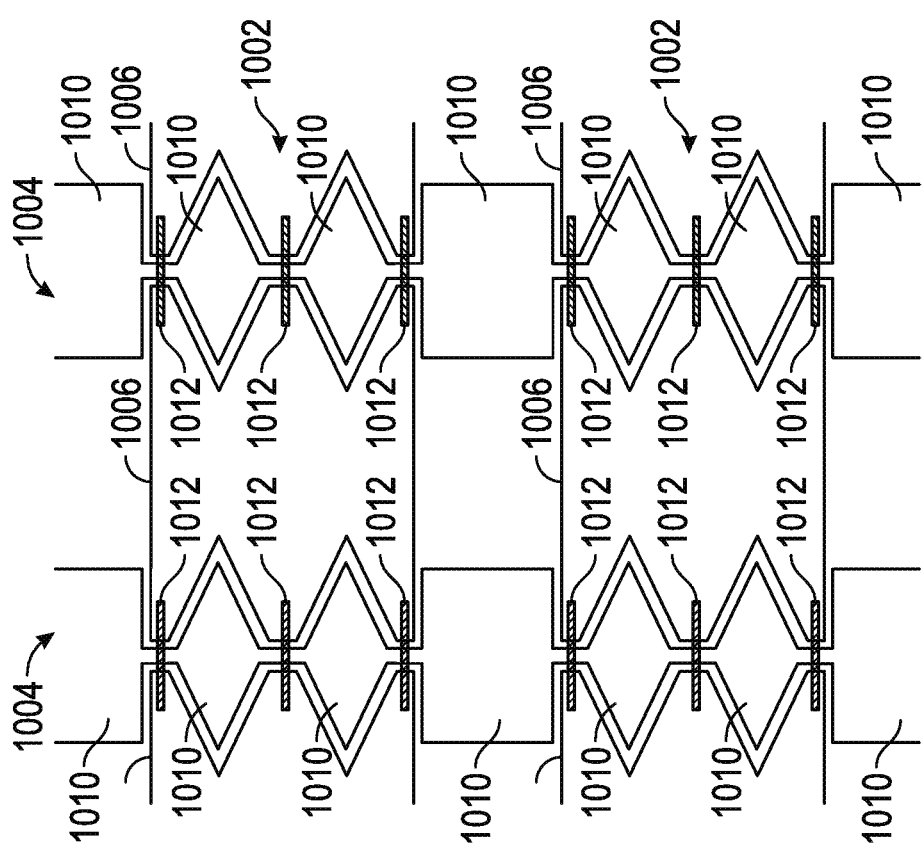
FIG. 10 illustrates an exemplary arrangement of drive and sense lines on a same side of a single substrate interconnected using a triple bridge configuration according to various examples.

While the above examples of the disclosure include a double bridge configuration, any number of bridges can be used. FIG. 10 illustrates an exemplary arrangement of drive and sense lines on the same side of a single substrate interconnected using a triple bridge configuration according to various examples. Sense lines 9 be formed by interconnecting sense line sections 1010. Drive lines 1002 can be formed by interconnecting drive line sections 1006 using bridges 1012, for example, which can connect individual sense line sections 1006 by crossing or jumping over drive line sections 1004 at the locations of necked-down areas 508. Bridges 1012 can connect individual sections 1006 over or under the connection point of sections 1006.

Figure 11C:
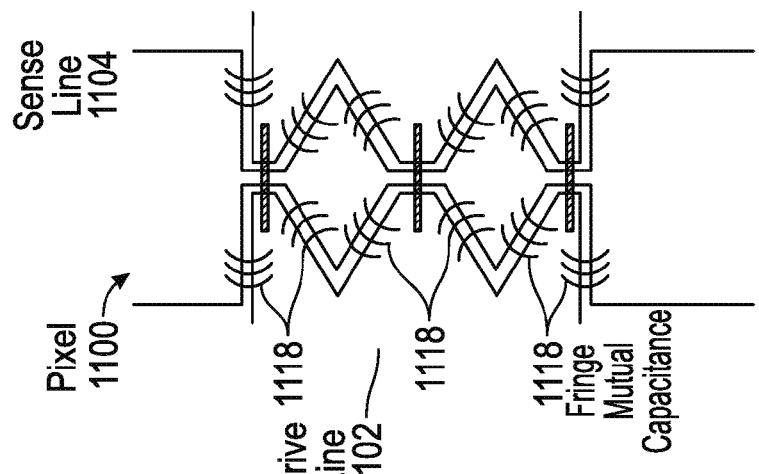
FIGS. 11A-11C illustrate an exemplary pixel generated from drive lines and sense lines on a same side of a single substrate according to various examples.
Figure 11B:
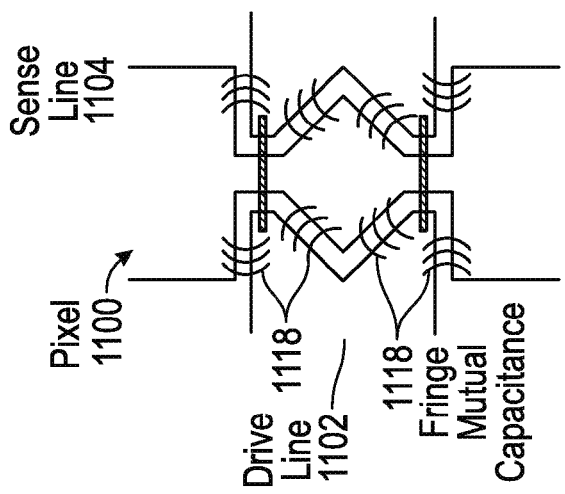
Figure 11A:
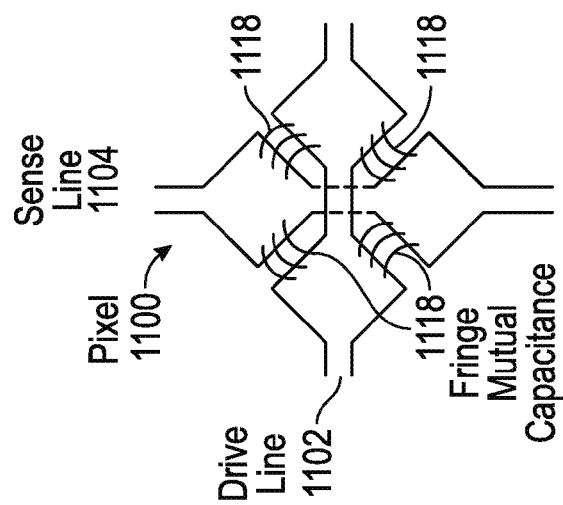

FIG. 11A-11D illustrate an exemplary pixel 1100 generated from drive lines 1102 and sense lines 1104 on the same side of a single substrate according to various examples of the disclosure. If drive line 1102 is stimulated with a stimulation signal Vstim, fringe mutual capacitance 1118 can form between the sections of the stimulated drive lines and the adjacent sections of the sense line. A user's finger or other object may be able to block some of the fringing electric field lines, thereby changing the mutual capacitance. As shown in FIG. 11A, for a single bridge configuration, there can be four "hot spots" of fringing mutual capacitance that can be blocked by a finger or other object. FIG. 11B illustrates an exemplary pixel using a double bridge configuration with eight "hot spots" or double the number of hot spots compared to the single bride configuration. FIG. 11C illustrates an exemplary pixel using a triple bridge configuration with twelve "hot spots" or triple the number of hot spots compared to the double bridge configuration. Increasing the number of bridges can increase the number of hot spots, which can improve the touch sensitivity. In some examples, the user's finger or object can block one or more hot spots, but not all hot spots in a pixel. In addition to improved touch sensitivity, multiple hot spots can enhance detection and differentiation between touch, hover, or proximity.

Figure 12:
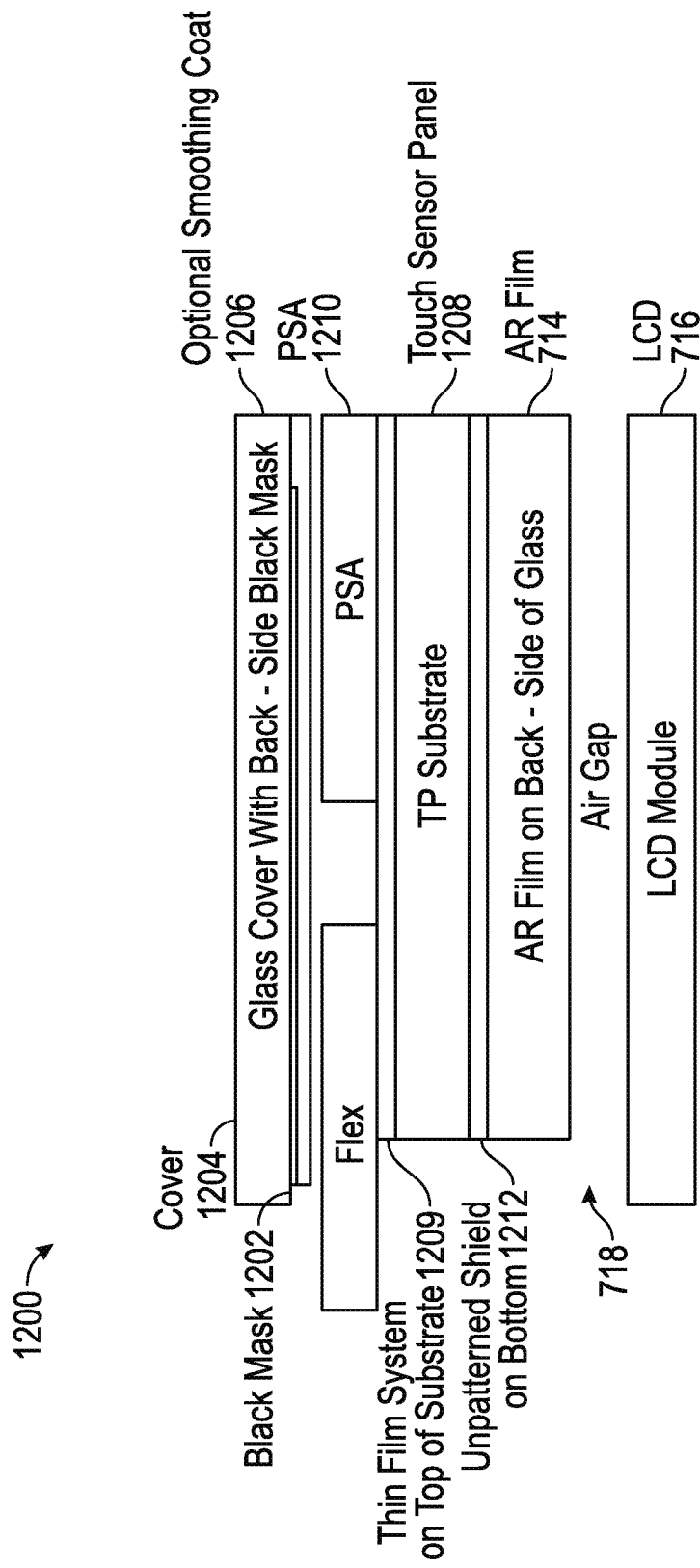
FIG. 12 illustrates an exemplary touch screen stackup according to various examples.

FIG. 12 illustrates an exemplary touch screen stackup 1200 according to various examples. It should be understood, however, that the various touch pixel examples disclosed herein can also be implemented in other configuration including, but not limited to, on the back side of a cover glass (BOC), the back side of the touch panel (TP) substrate, one glass solution (OGS), or integrated within a display module (e.g., OLED or LCD). In FIG. 12, black mask (or a mask of any color) 1202 can be formed on a portion of the back side of cover 1204, and an optional smoothing coat 1206 can be applied over the black mask and back side of the cover. According to certain examples, the black mask may be formed to cover the interconnect layer (614 of FIGS. 6A-6D) of the bridges interconnecting the sense line sections (606 of FIG. 6A), for example. Accordingly, visual artifacts caused by light reflecting from the interconnect layer of the bridges may be mitigated. Touch sensor panel 1208 of the type described above, with drive lines, sense lines, insulating material, and bridges formed on the same layer on the same side of a substrate, can be bonded to the cover with an adhesive, such as a pressure sensitive adhesive (PSA) 1210. An unpatterned layer of conductive material, such as ITO, 121 can optionally be formed on the bottom of the glass to act as a shield. Anti-reflective film 1214 can be deposited over unpatterned ITO 1212. LCD module 1016 can be placed beneath the substrate, optionally separated by air gap 1018 for ease of repair.

Figure 13A:
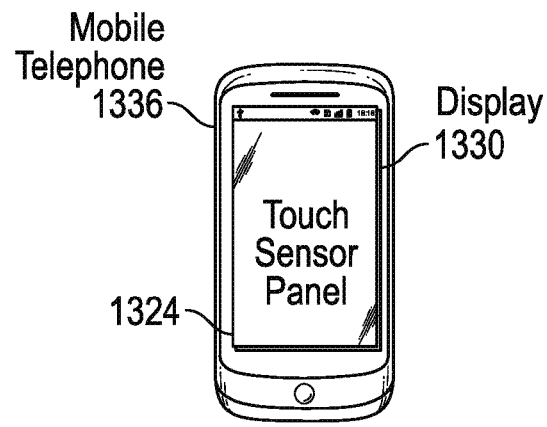
FIGS. 13A-13C illustrate an exemplary mobile telephone, an exemplary digital media player, and an exemplary personal computer that can include a touch sensor panel and a display device.
Figure 13B:
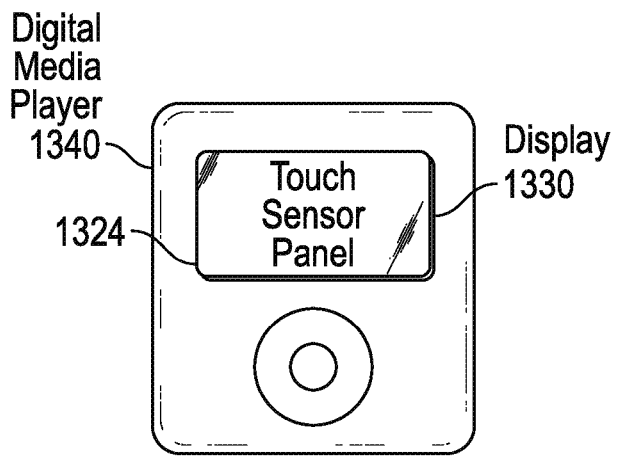
Figure 13C:
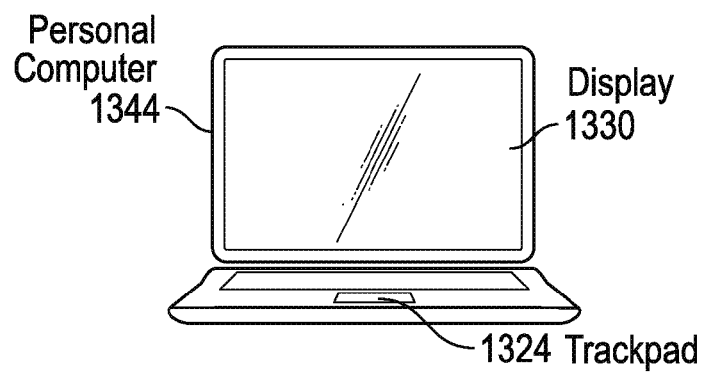

FIG. 13A illustrates an exemplary mobile telephone 1336 that can include touch sensor panel 1324 and display 1330. FIG. 13B illustrates an exemplary digital media player 1340 that can include touch sensor panel 1324 and display 1330. FIG. 13C illustrates an exemplary personal computer 1344 that can include touch sensor panel (trackpad) 1324 and display 1330. The touch sensor panels 1324 can include a touch pixel design according to one of the various examples described herein. In some examples, the display 1330 can be part of a touch screen.

Therefore according to the above disclosure, some examples of the disclosure are directed to a touch sensor panel, comprising: at least one first line formed from a plurality of first sections of a first conductive material on a first layer; at least one second line formed from a plurality of second sections of the first conductive material on the first layer; and a plurality of bridges of a second conductive material formed at an intersection of a first and second line, the plurality of bridges configured for enabling the first and second lines to cross over each other. Additionally or alternatively to one or more examples disclosed above, in other examples the plurality of bridges electrically connect two first sections in a single first line together. Additionally or alternatively to one or more examples disclosed above, in other examples a pattern of the first conductive material continuously formed with the second sections electrically connects two second sections in a single second line together. Additionally or alternatively to one or more examples disclosed above, in other examples the plurality of bridges are formed on a second layer different from the first layer. Additionally or alternatively to one or more examples disclosed above, in other examples at least one of the plurality of bridges comprises an insulating layer and an interconnect layer. Additionally or alternatively to one or more examples disclosed above, the plurality of second sections are serially connected using the plurality of bridges. Additionally or alternatively to one or more examples disclosed above, at least one second section is connected to another second section through multiple bridges. Additionally or alternatively to one or more examples disclosed above, in other examples the touch sensor panel further comprises a display device at least partially overlaying the touch sensor panel to form a touch screen. Additionally or alternatively to one or more examples disclosed above, in other examples the touch sensor panel further comprises a cover material, wherein the touch sensor panel is disposed on a back of the cover material. Additionally or alternatively to one or more examples disclosed above, in some examples the conductive material is Indium Tin Oxide (ITO). Additionally or alternatively to one or more examples disclosed above, in other examples the second conductive material is an opaque metal. Additionally or alternatively to one or more examples disclosed above, in some examples the first conductive material is the same as the second conductive material. Additionally or alternatively to one or more examples disclosed above, in other examples the touch sensor panel further comprises at least one conductive dummy region disposed between at least some of the first and second sections. Additionally or alternatively to one or more examples disclosed above, in some examples the touch sensor panel is incorporated within a computing system.

Additionally or alternatively to the one or more examples disclosed above, other examples of the disclosure are directed to a method of forming a touch sensor panel, comprising: forming at least one first line from a plurality of first sections of a first conductive material on a first layer; forming at least one second line from a plurality of second sections of the first conductive material on the first layer; and forming a plurality of bridges of a second conductive material at an intersection of a first and second line, the plurality of bridges configured for enabling the first and second lines to cross over each other. Additionally or alternatively to one or more examples disclosed above, in other examples the plurality of bridges electrically connect two first sections in a single first line together. Additionally or alternatively to one or more examples disclosed above, in other examples a pattern of first conductive material continuously formed with the second sections electrically connects two second sections in a single second line together. Additionally or alternatively to one or more examples disclosed above, in other examples the plurality of bridges are formed on a second layer different from the first layer. Additionally or alternatively to one or more examples disclosed above, in other examples one or more of the plurality of bridges comprise an insulating layer and an interconnect layer. Additionally or alternatively to one or more examples disclosed above, in other examples the insulating layer is an index matching layer. Additionally or alternatively to one or more examples disclosed above, in other examples the method further comprises disposing the touch sensor panel on a back of a cover material. Additionally or alternatively to one or more examples disclosed above, in other examples the first conductive material is Indium Tin Oxide (ITO). Additionally or alternatively to one or more examples disclosed above, in other examples the second conductive material is an opaque metal. Additionally or alternatively to one or more examples disclosed above, in other examples the first conductive material is the same as the second conductive material. Additionally or alternatively to one or more examples disclosed above, in other examples the method further comprises disposing at least one conductive dummy region in an area of the touch sensor panel around at least one of the plurality of first sections and second sections. Additionally or alternatively to one or more examples disclosed above, in other examples a number of the plurality of bridges is selected based on a resistance value of the touch sensor panel. Additionally or alternatively to one or more examples disclosed above, in other examples a number of the plurality of bridges is selected based on a number of hot spots of the touch sensor panel. Additionally or alternatively to one or more examples disclosed above, in other examples a size of the plurality of bridges is based on a resistance value of the touch sensor panel. Additionally or alternatively to one or more examples disclosed above, in other examples a size of the plurality of bridges is based on a ratio of bridge size to interconnect section size.

While various examples have been described above, it should be understood that they have been presented by way of example only, and not by way of limitation. Although examples have been fully described with reference to the accompanying drawings, the various diagrams may depict an example architecture or other configuration for this disclosure, which is done to aid in the understanding of the features and functionality that can be included in the disclosure. The disclosure is not restricted to the illustrated exemplary architectures or configurations, but can be implemented using a variety of alternative architectures and configurations. Additionally, although the disclosure is described above in terms of various examples and implementations, it should be understood that the various features and functionality described in one or more of the examples are not limited in their applicability to the particular example with which they are described. They instead can be applied alone or in some combination, to one or more of the other examples of the disclosure, whether or not such examples are described, and whether or not such features are presented as being part of a described example. Thus, the breadth and scope of the present disclosure should not be limited by any of the above-described examples.

What is claimed is:

1. A touch sensor panel, comprising:
   at least one first line formed from a plurality of first sections and a plurality of second sections of a first conductive material on a first layer, each of the plurality of first sections having a width less than each of the plurality of second sections;
   at least one second line formed from a plurality of third sections and a plurality of fourth sections of the first conductive material on the first layer, each of the plurality of third sections having a width less than each of the plurality of fourth sections; and
   a plurality first bridges of a second conductive material, each of the plurality of first bridges configured to electrically couple fourth sections,
   wherein an intersection of one of the at least one first line and one of the at least one second line includes first bridges crossing over at least two first sections.

2. The touch sensor panel of claim 1, further comprising a plurality of second bridges, each of the plurality of second bridges configured to electrically couple the plurality of second sections.

3. The touch sensor panel of claim 1, wherein a pattern of the first conductive material continuously formed with the plurality of first sections electrically couples the plurality of second sections in a single first line together.

4. The touch sensor panel of claim 1, wherein the plurality of first bridges are formed on a second layer different from the first layer.

5. The touch sensor panel of claim 1, wherein at least one of the plurality of first bridges comprises an insulating layer and an interconnect layer.

6. The touch sensor panel of claim 1, wherein the plurality of fourth sections are serially coupled using the plurality of first bridges.

7. The touch sensor panel of claim 1, wherein at least one of the plurality third sections is connected to another third section through multiple first bridges.

8. The touch sensor panel of claim 1, further comprising a display device at least partially overlaying the touch sensor panel to form a touch screen.

9. The touch sensor panel of claim 1, further comprising:
a cover material, wherein the touch sensor panel is disposed on a back of the cover material.

10. The touch sensor panel of claim 1, wherein the first conductive material is Indium Tin Oxide (ITO).

11. The touch sensor panel of claim 1, wherein the second conductive material is an opaque metal.

12. The touch sensor panel of claim 1, wherein the first conductive material is same as the second conductive material.

13. The touch sensor panel of claim 1, further comprising:
at least one conductive dummy region disposed between at least some of the plurality of second sections.

14. The touch sensor panel of claim 1, wherein the touch sensor panel is incorporated within a computing system.

15. A method of forming a touch sensor panel, comprising:
forming at least one first line from a plurality of first sections and a plurality of second sections of a first conductive material on a first layer, each of the plurality of first sections having a width less than each of the plurality of second sections;
forming at least one second line from a plurality of third sections and a plurality of fourth sections of the first conductive material on the first layer, each of the plurality of third sections having a width less than each of the plurality of fourth sections; and
forming a plurality of first bridges of a second conductive material, each of the plurality of first bridges configured to electrically couple fourth sections,
wherein an intersection of one of the at least one first line and one of the at least one second line includes first bridges crossing over at least two first sections.

16. The method of claim 15, further comprising forming a plurality of second bridges, each of the plurality of second bridges configured to electrically couple the plurality of second sections.

17. The method of claim 15, wherein forming the at least one first line includes patterning the first conductive material to continuously electrically couple the plurality of second sections in a single second line together.

18. The method of claim 15, wherein the plurality of first bridges are formed on a second layer different from the first layer.

19. The method of claim 15, wherein forming the plurality of first bridges includes forming an insulating layer and forming an interconnect layer.

20. The method of claim 19, wherein the insulating layer is an index matching layer.

21. The method of claim 15, further comprising:
disposing the at least one of the first line or second line on a back of a cover material.

22. The method of claim 15, wherein the plurality of first bridges is formed before the at least one first line and at least one second line are formed.

23. The method of claim 15, wherein the plurality of first bridges is formed after the at least one first line is formed and before the at least one second line is formed.

24. The method of claim 15, further comprising:
disposing at least one conductive dummy region in an area of the touch sensor panel around at least one of the plurality of second sections.

25. The method of claim 15, further comprising determining at least one of a number and a size of the plurality of first bridges based on a resistance value of the touch sensor panel.

26. The touch sensor panel of claim 1, wherein a number of the plurality of first bridges is selected based on a number of hot spots of the touch sensor panel.

27. The touch sensor panel of claim 1, further comprising:
a plurality of fifth sections of the first conductive material on the first layer, wherein the plurality of first bridges are configured to electrically couple the plurality of second sections through the plurality fifth sections.

28. The touch sensor panel of claim 1, wherein a number of first bridges in each intersection is greater than two.

29. The touch sensor panel of claim 5, wherein at least one of the plurality of first bridges further comprises a black mask disposed on the interconnect layer.

* * * * *